(12) United States Patent
Bixel et al.

(10) Patent No.: US 11,551,654 B2
(45) Date of Patent: Jan. 10, 2023

(54) SYSTEMS AND METHODS FOR CONSTRUCTING NOISE REDUCING SURFACES

(71) Applicant: Nut Shell LLC, Redmond, WA (US)

(72) Inventors: Douglas Allan Bixel, Redmond, WA (US); Benjamin F. Forrest, Redmond, WA (US)

(73) Assignee: Nut Shell LLC, Redmond, WA (US)

( * ) Notice: Subject to any disclaimer, the term of this patent is extended or adjusted under 35 U.S.C. 154(b) by 522 days.

(21) Appl. No.: 15/422,308

(22) Filed: Feb. 1, 2017

(65) Prior Publication Data

US 2017/0221468 A1 Aug. 3, 2017

Related U.S. Application Data

(60) Provisional application No. 62/290,356, filed on Feb. 2, 2016.

(51) Int. Cl.
*G10K 11/168* (2006.01)
*E04B 1/86* (2006.01)
(Continued)

(52) U.S. Cl.
CPC ............ *G10K 11/168* (2013.01); *B32B 5/022* (2013.01); *B32B 5/145* (2013.01); *B32B 7/12* (2013.01);
(Continued)

(58) Field of Classification Search
CPC ....... G10K 11/168; B32B 13/14; B32B 13/00; B32B 23/10; B32B 23/00;
(Continued)

(56) References Cited

U.S. PATENT DOCUMENTS 1,284,933 A * 11/1918 Sabine ................. E04B 1/8404
181/285
1,660,745 A * 2/1928 Delaney .................... E04B 1/86
181/285
(Continued)

FOREIGN PATENT DOCUMENTS

CN 110747767 B * 3/2021 ................ E01F 8/00
EP 0467867 1/1992
(Continued)

OTHER PUBLICATIONS

International Search Report (ISR) and Written Opinion (WO) dated Jun. 28, 2018 for international application PCT/US2018/022439.
(Continued)

*Primary Examiner* — Edgardo San Martin
(74) *Attorney, Agent, or Firm* — Dorsey & Whitney LLP (57) ABSTRACT

Systems and methods are disclosed for a multi-layered sound absorption structure. The multi-layered sound absorption structure may include a form material, an acoustic material disposed on a surface of the form material, and a construction material disposed on the acoustic material. The acoustic material may couple to the construction material during curing of the construction material. After the construction material is cured, the form material may be removed exposing a least a portion of the acoustic material.

17 Claims, 6 Drawing Sheets

(51) Int. Cl.
| | |
|---|---|
| *D06M 11/00* | (2006.01) |
| *E04B 9/04* | (2006.01) |
| *B32B 23/00* | (2006.01) |
| *E04B 9/00* | (2006.01) |
| *B32B 13/14* | (2006.01) |
| *B32B 7/12* | (2006.01) |
| *B32B 5/02* | (2006.01) |
| *B32B 5/14* | (2006.01) |
| *D06M 101/32* | (2006.01) |

(52) U.S. Cl.
CPC .............. *B32B 13/14* (2013.01); *B32B 23/00* (2013.01); *D06M 11/00* (2013.01); *E04B 1/86* (2013.01); *E04B 9/001* (2013.01); *E04B 9/045* (2013.01); *B32B 2250/02* (2013.01); *B32B 2250/03* (2013.01); *B32B 2255/02* (2013.01); *B32B 2260/021* (2013.01); *B32B 2260/023* (2013.01); *B32B 2260/044* (2013.01); *B32B 2262/0253* (2013.01); *B32B 2262/0276* (2013.01); *B32B 2262/101* (2013.01); *B32B 2307/102* (2013.01); *B32B 2307/722* (2013.01); *B32B 2307/726* (2013.01); *B32B 2307/73* (2013.01); *B32B 2419/00* (2013.01); *D06M 2101/32* (2013.01)

(58) Field of Classification Search
CPC ..... E04B 2001/8457; E04B 2001/8461; E04B 9/001; E04B 1/86; E04B 2001/8254; E04B 2001/8452; E04B 9/045; D06M 11/00; D06M 2101/32
USPC ....................................................... 181/285
See application file for complete search history.

(56) References Cited

U.S. PATENT DOCUMENTS

| | | | | |
|---|---|---|---|---|
| 2,007,130 A * | 7/1935 | Munroe | ............... | E04B 1/86 181/285 |
| 2,130,919 A | 9/1938 | Gunnar et al. | | |
| 2,140,210 A * | 12/1938 | Schenk | ............... | E04B 1/86 181/291 |
| 2,199,946 A * | 5/1940 | Barnhart | ............... | E04C 1/41 52/310 |
| 2,694,025 A * | 11/1954 | Slayter | ............... | C04B 26/12 162/156 |
| 2,706,306 A | 4/1955 | Sheetz et al. | | |
| 2,868,008 A * | 1/1959 | Toulmin, Jr. | ......... | B28B 23/0068 52/309.14 |
| 3,001,602 A * | 9/1961 | Taylor | ............... | E04B 1/8404 181/285 |
| 3,295,278 A * | 1/1967 | Muhm | ............... | E04C 2/044 52/794.1 |
| 3,435,580 A * | 4/1969 | Johnson | ............... | E04C 2/284 52/576 |
| 3,866,001 A * | 2/1975 | Kleinschmidt | ....... | E04B 1/8404 181/285 |
| 3,867,995 A * | 2/1975 | Sanders | ............... | E04B 1/8218 181/285 |
| 4,094,380 A * | 6/1978 | Kobayashi | ......... | E01F 8/0029 181/285 |
| 4,164,831 A * | 8/1979 | Messick | ............... | E04C 2/044 52/612 |
| 4,566,558 A * | 1/1986 | Link, Jr. | ............... | E01F 8/007 180/290 |
| 4,607,466 A * | 8/1986 | Allred | ............... | G10K 11/168 181/284 |
| 4,885,891 A | 12/1989 | Lynch | | |
| 4,989,688 A * | 2/1991 | Nelson | ............... | E04B 1/8227 181/286 |
| 5,119,606 A * | 6/1992 | Graham | ............... | E04C 2/521 52/125.4 |
| 5,202,174 A * | 4/1993 | Capaul | ............... | B32B 13/02 156/291 |
| 5,209,037 A * | 5/1993 | Kennedy | ............... | B28B 19/003 52/309.12 |
| 5,511,348 A | 4/1996 | Cornell et al. | | |
| 5,588,272 A * | 12/1996 | Haponski | ............... | E04C 2/06 52/125.4 |
| 5,697,189 A * | 12/1997 | Miller | ............... | E04C 2/2885 52/794.1 |
| 5,765,334 A * | 6/1998 | Vitous | ............... | B29C 67/243 181/294 |
| 5,813,160 A | 9/1998 | Thoelke | | |
| 6,006,809 A | 12/1999 | Williams et al. | | |
| 6,077,613 A * | 6/2000 | Gaffigan | ............... | B32B 3/14 428/442 |
| 6,244,008 B1 * | 6/2001 | Miller | ............... | E04C 2/2885 52/794.1 |
| 6,345,638 B1 | 2/2002 | Warner | | |
| 6,446,751 B1 | 9/2002 | Ahuja et al. | | |
| 6,478,039 B2 | 11/2002 | Suh | | |
| 6,575,656 B2 | 6/2003 | Suh | | |
| 6,613,424 B1 * | 9/2003 | Putt | ............... | B32B 13/04 428/312.4 |
| 6,742,309 B2 | 6/2004 | Stewart et al. | | |
| 7,422,026 B2 | 9/2008 | Kim | | |
| 7,503,428 B1 * | 3/2009 | Johnson | ............... | E01F 8/007 181/290 |
| 7,913,812 B2 * | 3/2011 | Sanders | ............... | E01F 8/0082 181/210 |
| 8,316,508 B2 | 11/2012 | Lapping | | |
| 8,544,218 B2 * | 10/2013 | Dellinger | ............... | E04B 1/84 181/284 |
| 8,579,079 B2 * | 11/2013 | Beauvilain | ............... | B60R 13/08 181/290 |
| 8,684,135 B2 * | 4/2014 | Smith | ............... | G10K 11/162 181/294 |
| 8,708,098 B2 * | 4/2014 | Roy | ............... | E04F 15/20 181/290 |
| 8,769,912 B2 * | 7/2014 | Stanhope | ............... | E04F 15/02 52/745.19 |
| 8,789,328 B2 * | 7/2014 | Selph | ............... | E04C 2/384 52/309.14 |
| 8,839,593 B2 * | 9/2014 | Barrett | ............... | E04C 3/34 52/834 |
| 2003/0102184 A1 * | 6/2003 | Brisson | ............... | B32B 25/10 181/290 |
| 2003/0219133 A1 | 11/2003 | Horrall et al. | | |
| 2004/0065506 A1 * | 4/2004 | Salls | ............... | E01F 8/0082 181/285 |
| 2004/0182430 A1 | 9/2004 | Seo | | |
| 2005/0000751 A1 * | 1/2005 | Sheng | ............... | E04B 1/86 181/290 |
| 2005/0161071 A1 | 7/2005 | Tseng | | |
| 2005/0268562 A1 | 12/2005 | Thacher | | |
| 2006/0042673 A1 | 3/2006 | Tseng | | |
| 2006/0101756 A1 * | 5/2006 | McClure | ............... | E04C 1/41 52/405.1 |
| 2006/0247919 A1 | 11/2006 | Specht et al. | | |
| 2009/0050401 A1 * | 2/2009 | Sanders | ............... | E01F 8/0082 181/141 |
| 2009/0107059 A1 * | 4/2009 | Kipp | ............... | C04B 28/26 52/144 |
| 2010/0078260 A1 * | 4/2010 | McNeal, Jr. | ......... | E01F 8/0029 181/290 |
| 2010/0224442 A1 * | 9/2010 | Sanders | ............... | B29B 17/0042 181/294 |
| 2011/0171456 A1 * | 7/2011 | Weidinger | ............... | B32B 3/06 428/314.8 |
| 2012/0305042 A1 | 12/2012 | Lorbiecki | | |
| 2013/0185061 A1 | 7/2013 | Arvanaghi et al. | | |
| 2013/0186706 A1 | 7/2013 | Bliton et al. | | |
| 2013/0199868 A1 * | 8/2013 | Bergiadis | ............... | E01F 8/0023 181/210 |
| 2015/0003625 A1 | 1/2015 | Uhle et al. | | |
| 2015/0034415 A1 | 2/2015 | Furusawa et al. | | |
| 2015/0055790 A1 | 2/2015 | Kawakami et al. | | |

(56) References Cited

U.S. PATENT DOCUMENTS

| | | |
|---|---|---|
| 2015/0139435 A1 | 5/2015 | Forrest et al. |
| 2016/0253987 A1 | 9/2016 | Chattell |
| 2019/0156812 A1* | 5/2019 | Bixel .................. G10K 11/168 |

FOREIGN PATENT DOCUMENTS

| | | | | |
|---|---|---|---|---|
| JP | H07242458 A | * | 9/1995 | ............. C04B 32/00 |
| JP | H0853899 A | * | 2/1996 | ............. E04B 9/041 |
| JP | H08133813 A | * | 5/1996 | ............. C04B 32/00 |
| JP | 2009317047 | | 12/1997 | |
| JP | H10148005 A | * | 6/1998 | ............... E04B 5/32 |
| JP | 3153274 B2 | * | 4/2001 | ............... E04C 2/04 |
| JP | 2009257080 | | 11/2009 | |
| KR | 101655915 B1 | * | 9/2016 | ............... E01B 2/00 |
| WO | 2008120071 | | 10/2008 | |
| WO | 2018170131 | | 9/2018 | |

OTHER PUBLICATIONS

Forrest, et al., Office Action dated Dec. 16, 2016 for U.S. Appl. No. 14/543,695.

Forrest, et al., Office Action dated May 26, 2016 for U.S. Appl. No. 14/543,695.

Lorbiecki, et al., Office Action dated Jul. 24, 2013 for U.S. Appl. No. 13/153,202.

Lorbiecki, et al., Office Action dated May 13, 2016 for U.S. Appl. No. 13/153,202.

* cited by examiner

SYSTEMS AND METHODS FOR CONSTRUCTING NOISE REDUCING SURFACES

CROSS-REFERENCE TO RELATED APPLICATIONS

This patent application claims priority to U.S. Provisional Patent Application No. 62/290,356, entitled "SYSTEMS AND METHODS FOR CONSTRUCTING NOISE REDUCING SURFACES," filed Feb. 2, 2016, the entirety of which is incorporated herein by reference.

TECHNICAL FIELD

The present disclosure is directed to systems and methods for constructing structures and/or surfaces for absorbing sound energy. More particularly, this disclosure relates to systems and methods for providing sound dampening wherein a sound absorption system is integrally formed with a structural surface.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Many buildings are filled with various sources of noise, including people, vehicles, music players, computers, televisions, appliances, etc. This sound may cause confusion, strain, anxiety, privacy concerns, and/or miscommunication. In many of these buildings, sound dampening materials are installed after construction of the building structure to absorb sound energy from the noise sources and reduce the amount of sound traveling though, and/or reflecting off of, the surfaces of the building. The installation process of such material after construction may result in increased costs and inconsistency of application throughout the building.

The present disclosure relates to systems and methods for installing sound absorption systems that are integrally formed with structural elements of the building. This may reduce installation costs, provide uniformity of sound dampening, and/or streamline the scheduling of a construction project. In some embodiments, the systems and methods generally relate to installing an acoustic medium during a construction process comprising pouring a construction material (e.g., a curing construction material or uncured construction material) such as concrete, cement (e.g., gypsum cement) or another cementitious material, a composite material, or a plaster onto an acoustic medium; wherein a portion of the construction material migrates into a region of the acoustic medium, and curing the construction material such that the acoustic medium is integrally bonded to the construction material.

In certain embodiments, the systems and methods may be used in the construction of various components of a building such as ceilings, floors, walls, and elevator shafts. And in particular embodiments, the systems and methods may be used for surfaces that are a ceiling for one story (e.g., a first story) and a floor for another story (e.g., a second story) of a multi-story building. In yet further embodiments, the systems and methods may also be used in post tension slab construction.

For simplicity and clarity of illustration, the figures illustrate the general manner of construction, and descriptions and details of well-known features and techniques may be omitted to avoid unnecessarily obscuring the discussion of the described embodiments. Additionally, elements in the figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. Objects described herein as being "adjacent" to each other may be in physical contact with each other, in close proximity to each other, or in the same general region or area as each other, as appropriate for the context in which the phrase is used.

The phrase "coupled to" is broad enough to refer to any suitable coupling or other form of interaction between two or more entities, including mechanical, fluid and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive).

Figure 1:
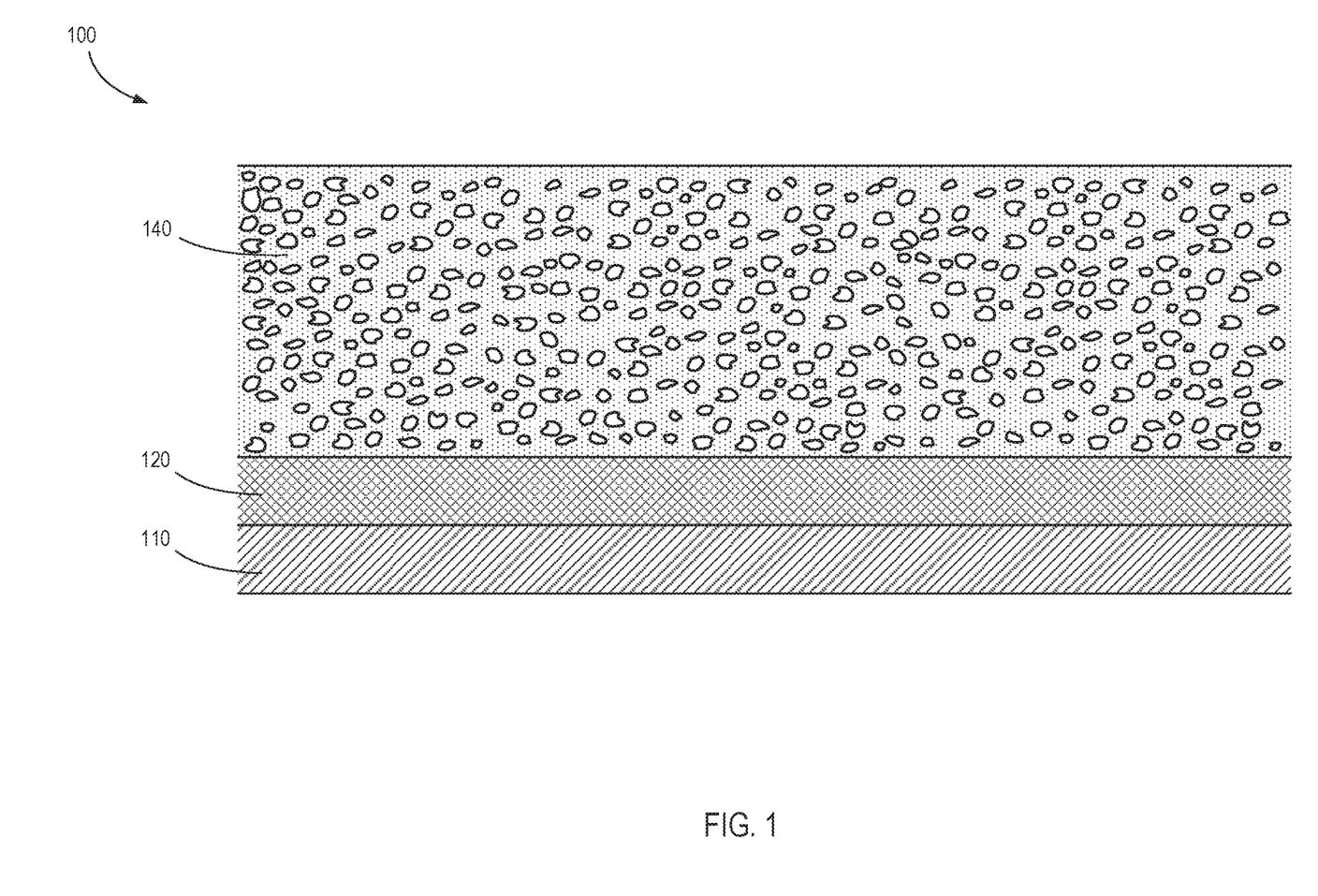
FIG. 1 is a cross-sectional view of a multi-layered sound absorption structure, according to an embodiment of the disclosure.

FIG. 1 illustrates a cross-sectional view of a multi-layered structure 100 according to an embodiment of the present disclosure. The multi-layered structure 100 can also be referred to as a multi-layered sound absorption structure, or a sound absorption system, etc. As shown in FIG. 1, the multi-layered structure 100 comprises an acoustic medium 120 and a construction material 140. The multi-layered structure 100 also comprises a form material 110, although in some instances the form material 110 can be removed after manufacturing, as further detailed below.

The form material 110 can include various types of materials. For example, in some embodiments, the form material 110 comprises one or more of wood, metal, plastic, fiberglass, and resin. In certain embodiments, the form material 110 is used to at least temporarily hold or otherwise retain the acoustic medium 120 and the construction material 140, such as when the construction material 140 cures and/or otherwise hardens or solidifies (such as from a fluid state to a solid state). The form material 110 may also be coupled to an additional support structure to further support a weight of the multi-layered structure 100. As previously stated, in certain embodiments, the form material 110 may be removed after the construction material 140 has cured. In other embodiments, a form material 110 is not used, and the construction material 140 is poured or otherwise disposed on the acoustic medium 120 without the need of a form material 110. In yet other embodiments, a form material 110 is disposed adjacent to one or more of the bottom surface and side surfaces (or perimeter) of the acoustic medium 120.

The acoustic medium 120 may comprise various types of sound dampening material. For example, in some embodiments, the acoustic medium 120 comprises a fibrous sound dampening material such as polyester and/or fiberglass. The acoustic medium 120 may also be porous, such that it may absorb (or at least partially absorb) a liquid or fluid material such as a liquid or fluid construction material 140. The acoustic medium 120 may also be permeable, or semipermeable. In further embodiments, the acoustic medium 120 is also substantially water or moisture-resistant.

In some embodiments, the acoustic medium 120 may comprise a nonwoven fabric. For example, the acoustic medium 120 may comprise a spunbonded olefin or polyester. Certain nonwoven acoustic mediums 120 may permit water vapor to pass through, such as during a curing phase of the construction material 140, while limiting the flow of fluid or liquid construction material 140 to one or more regions of the acoustic medium 120. Additionally, because of its fibrous structure, nonwoven acoustic mediums 120 may facilitate bonding to the construction material 140, as further detailed below.

The acoustic medium 120 may also comprise a treated acoustic media or material. For example, the acoustic medium 120 can comprise acoustic material of which at least a portion is melted using one or more of heat, acid, or other chemical compounds. In some of such embodiments, the acoustic medium 120 may be at least partially melted using heat from one or more of a flame, a hot iron, and exposure to heated gases.

In various embodiments, the acoustic medium 120 can comprise one or more of a high melt and a low melt acoustic material. High melt acoustic materials can refer to materials having a melting point above about 450° F. Low melt acoustic materials can refer to materials having a melting point above about 320° F. In some of these embodiments, the acoustic medium 120 may comprise between about 50% and 95%, or between about 70% and 90% by weight of a high melt material; and between about 5% and 50%, or between about 10% and 30% by weight of a low melt material.

At least a region of the acoustic medium 120 can be coupled (e.g., integrally coupled) to the construction material 140. For example, during manufacturing, a fluid and/or uncured construction material 140 can be poured, dispensed, and/or otherwise disposed onto a surface of the acoustic medium 120. At least a portion of the fluid or uncured construction material 140 can then migrate and/or flow through the surface and into a region of the acoustic medium 120 before curing or otherwise solidifying. In particular embodiments, the fluid and/or uncured construction material 140 flows into voids (or the porous network) between individual fibers (or clusters of fibers) of the acoustic medium 120. In some instances, this flow of construction material 140 into the region of the acoustic medium 120 can be described as interdigitation.

The construction material 140 can flow into the acoustic medium 120 to varying depths. For example, in certain embodiments, the construction material 140 flows or migrates into the acoustic medium 120 to a depth or distance of between about 1/32 and about 1/8, or between about 1/24 and about 1/12 inches.

As the construction material 140 cures and/or otherwise hardens or solidifies, the construction material 140 dispersed throughout a region of the acoustic medium 120 (e.g., the interdigitated construction material 140) can cure around the fibers (or clusters of fibers) of the acoustic medium 120 thereby binding or coupling the construction material 140 to the acoustic medium 120. In the resulting multi-layer structure 100, the acoustic medium 120 can be described as being integrally bound or coupled to the construction material 140. At least a portion of the fibers of the acoustic medium 120 can also be described as being disposed within a portion of the construction material 140. Further, in some embodiments, the integral coupling can create a bond between the acoustic medium 120 and the construction material 140 that does not require an additional mechanical coupling device. In other embodiments, a mechanical coupling device may be added after the curing process to reinforce the integral coupling of the construction material 140 and the acoustic medium 120.

With continued reference to FIG. 1, at least one surface of the acoustic medium 120 may be integrally coupled to the construction material 140. For example, if the acoustic medium 120 is a rectangular prism-shaped panel, a surface of the acoustic medium 120 that is opposite the form material 110 may be coupled to the construction material 140. In some of these embodiments, one or more of side surfaces of the acoustic medium 120 may also be coupled to the construction material 140. In some such embodiments, the one or more surfaces may also comprise a barrier material to prevent excessive absorption of the construction material 140 by the acoustic medium 120, as further detailed below. In further embodiments, at least a portion of one or more surfaces of the acoustic medium 120 is not in direct contact with the curing construction material 140. This may facilitate a direct interface of the one or more surfaces of the acoustic medium 120 to the form material 110, such that when the form material 110 is removed at least a portion of one surface of the acoustic medium 120 is exposed.

As can be appreciated, the acoustic medium 120 may comprise acoustic panels that may be any size including, but not limited to, about two feet by two feet, two feet by four feet, four feet by four feet, four feet by six feet, six feet by six feet, four feet by eight feet, or four feet by 10 feet. The acoustic medium 120 or panel may also be any thickness including, but not limited to, about half of an inch, about one to two inches, about two to four inches, or about four to six inches.

The acoustic medium 120 may also comprise material at various densities. In some embodiments, the acoustic medium 120 may comprise a plurality of regions of material having distinct densities. The plurality of regions of material having distinct densities may have different sound absorption capabilities and may target various frequency ranges of sounds. In some embodiments, the acoustic medium 120 may comprise acoustic material of one or more of the following ranges of density: two to three pounds per cubic foot, two to four pounds per cubic foot, four to six pounds per cubic foot, six to eight pounds per cubic foot, and eight to 15 pounds per cubic foot. In certain embodiments, the acoustic medium 120 may comprise two or more regions of discrete densities. In some of these embodiments, a region having a higher density is at least partially disposed adjacent the form material 110. In other embodiments, a region having a higher density is at least partially disposed adjacent the construction material 140.

In some embodiments, the acoustic medium 120 comprises at least three regions of discrete densities. In some of these embodiments, a region having a lowest density is at least partially disposed between the two remaining regions. For example, in some of these embodiments, a region having the highest density is disposed adjacent the form material 110 and a region having the next highest density is disposed adjacent the construction material 140. In other similar embodiments, a region having the highest density is disposed adjacent the construction material 140 and the region having the next highest density is disposed adjacent the form material 110.

In some embodiments, the acoustic medium 120 may reduce acoustic energy by at least 20%, at least 30%, at least 40%, at least 50%, at least 75%, or at least 90%. In other embodiments, the acoustic medium 120 may reduce acoustic energy in an amount ranging from 50% to 90%. The standard for measuring such a reduction of acoustic energy may be a Noise Reduction Coefficient (NRC) as tested under ASTM C423.

Figure 2:
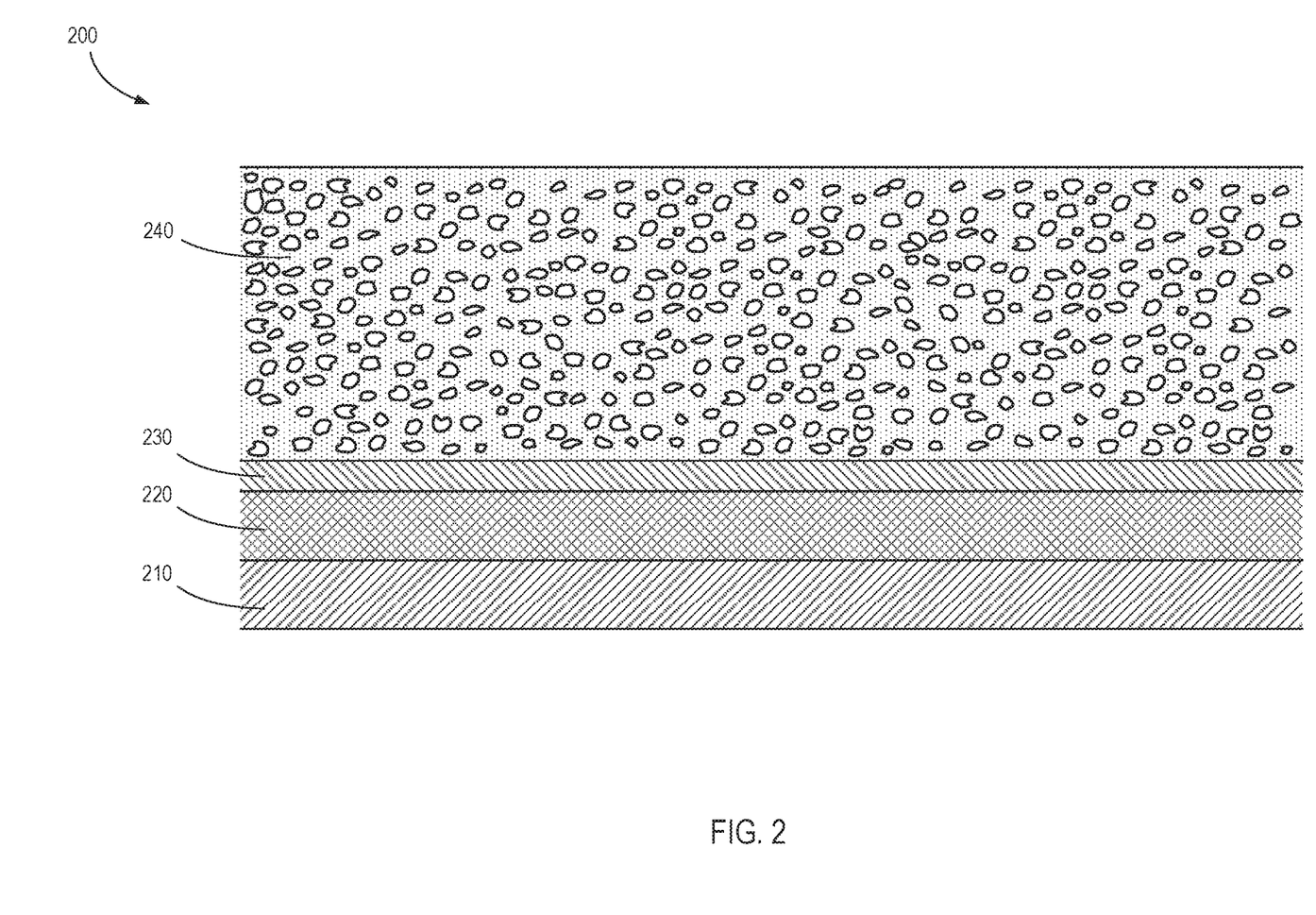
FIG. 2 is a cross-sectional view of another embodiment of a multi-layered sound absorption structure.

FIG. 2 depicts a multi-layer structure 200 according to another embodiment of the present disclosure. As shown in FIG. 2, in some embodiments, the acoustic medium 220 can include a barrier 230, or a separate barrier layer 230 can be disposed between the acoustic medium 220 and the construction material 240. In such embodiments, the barrier 230 can aid in limiting and/or minimizing the amount of construction material 240 that flows, migrates, or saturates the acoustic medium 220. As further detailed below, the barrier 230 may, in some instances, comprise a portion of the acoustic medium 220 (such as a treated portion of the acoustic medium 220). In additional embodiments, an acoustic material may comprise the form material 210 and the acoustic medium 220.

In some embodiments, the barrier 230 may be formed by treating a portion of the acoustic medium 220. For example, treating a portion of the acoustic medium 220 may comprise heating a portion of the acoustic medium 220, or coating a portion of the acoustic medium 220 with one or more of a moisture-resistant material and a moisture-proof material to thereby form a barrier layer 230. Coating a portion of the acoustic medium 220 may also comprise applying a thin layer of moisture-resistant material such that at least some fibers of the acoustic medium 220 penetrate the moisture-resistant material and are exposed to the construction material 240.

The barrier 230 may also be formed of a semi-permeable, moisture-resistant material such that a portion of the acoustic medium 220 may absorb a portion of the construction material 240 that flows through the barrier 230. Partial absorption may facilitate coupling of the acoustic medium 220 to the curing construction material 240. In other embodiments, the barrier 230 may comprise fibrous material that absorbs a portion of the construction material 240 to couple the barrier 230 to the construction material 240 during a curing process while limiting contact between the acoustic medium 220 and the construction material 240. In some of these embodiments, the barrier 230 is coupled to the acoustic medium 220 during a manufacturing process of the acoustic medium 220. In other embodiments, the barrier 230 may be coupled to the acoustic medium 220 after a manufacturing process of the acoustic medium 220. In some such embodiments, the barrier 230 may be coupled to the acoustic medium 220 using a bonding method comprising one or more of heat and pressure. In other embodiments, the barrier 230 may be coupled to the acoustic medium 220 using adhesive material.

Figure 3:
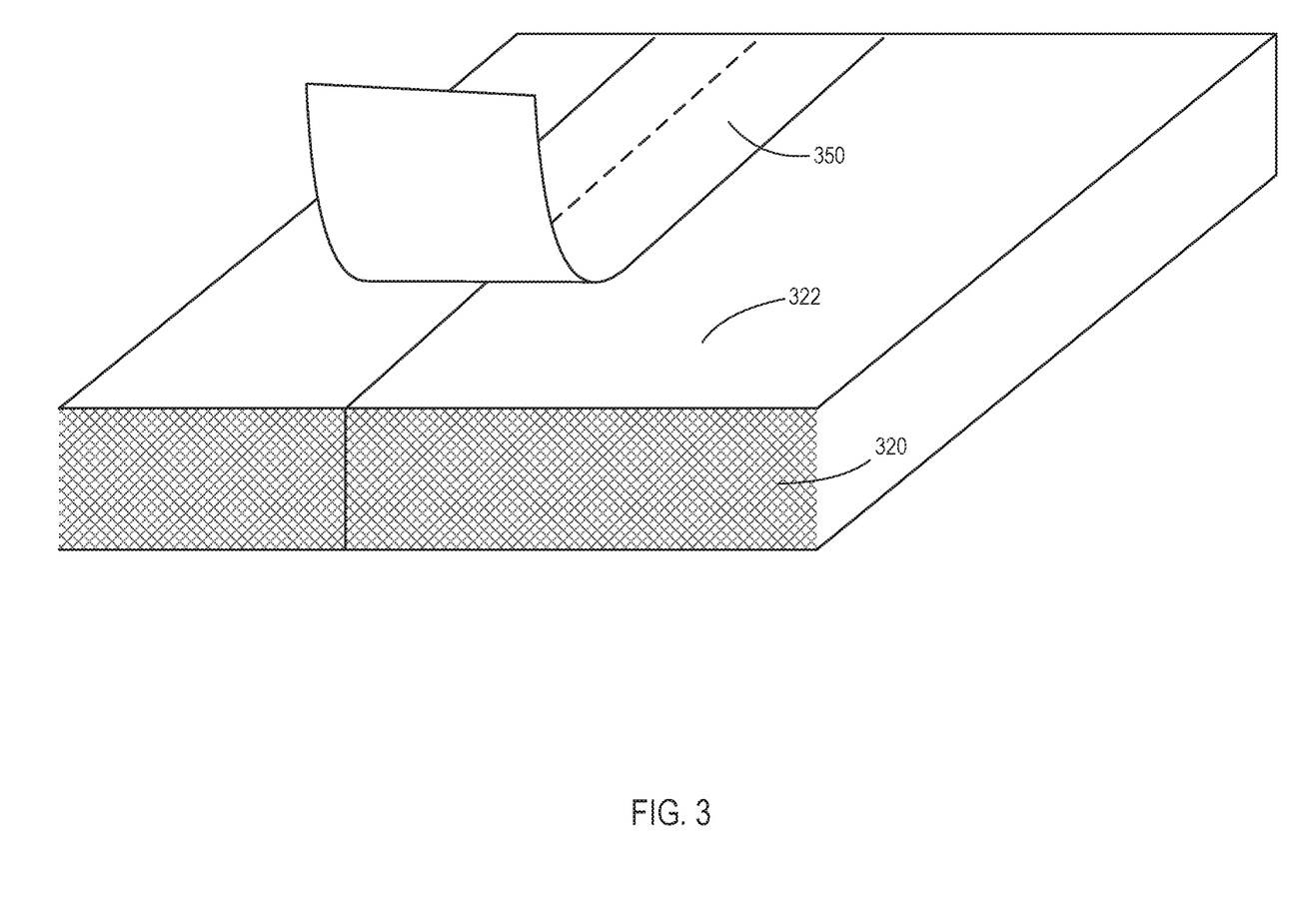
FIG. 3 is a perspective view of a junction of two acoustic panels of the acoustic medium, according to an embodiment of the disclosure.

FIG. 3 is a perspective view of two panels of the acoustic medium 320 being coupled together using an overlay material 350. As shown in the illustration, the overlay material 350 may be coupled or attached to a surface 322 of each of the two panels of the acoustic medium 320 (or a surface of the barrier if a barrier layer is used). As further shown in FIG. 3, the overlay material 350 can cover the joint (or gap) between the two panels, forming a barrier over the joint. In such embodiments, the overlay material 350 can restrict or prevent the construction material from flowing through (e.g., completely through) the joint area (or gap) between the panels. In other words, the overlay material 350 can prevent the construction material from flowing from one side (e.g., a top side) of the acoustic medium 320 to a second or opposite side (e.g., a bottom side) of the acoustic medium 320.

In some embodiments, the overlay material 350 comprises a tape or an adhesive tape, such as a seam tape or a drywall tape. In other embodiments, the overlay material 350 may comprise one or more of plastic and metal. In some embodiments, the overlay material 350 can also allow minimal flow of the construction material, while restricting enough of the flow to prevent the construction material from flowing completely through the joint area. The overlay material 350 can also be substantially moisture resistant.

Figure 4A:
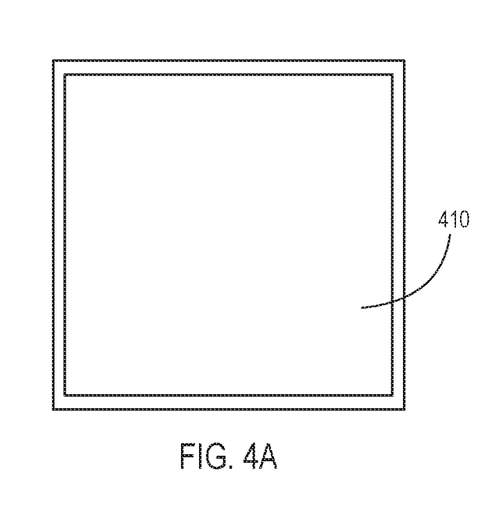
FIG. 4A is a top view of a form material, according to an embodiment of the disclosure.
Figure 4B:
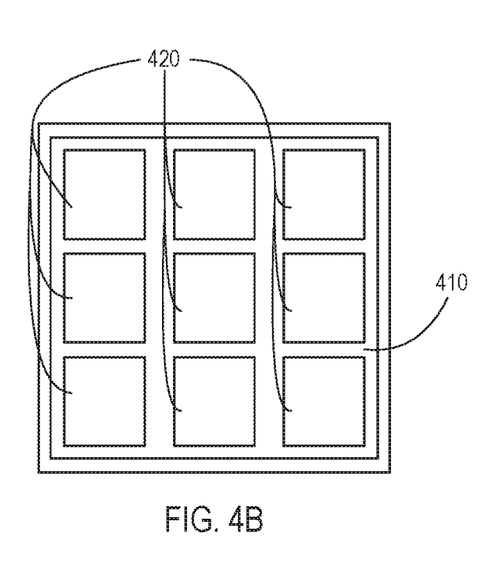
FIG. 4B is a top view of a form material and an array of acoustic media, according to an embodiment of the disclosure.
Figure 4C:
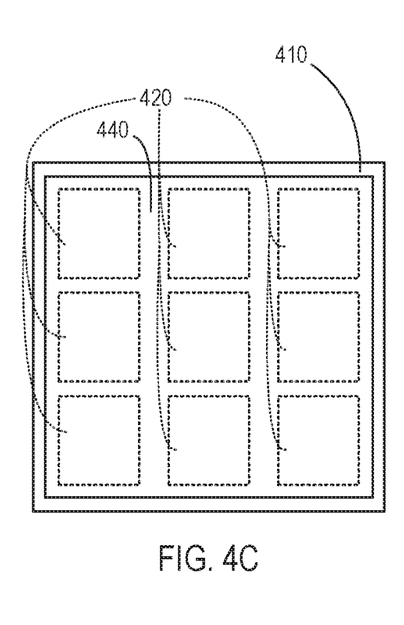
FIG. 4C is a top view of a multi-layered sound absorption structure, according to an embodiment of the disclosure.

FIG. 4A is a top view of a configuration of a form material 410. FIG. 4B is a top view of a configuration of a form material 410 with an array of acoustic media 420 disposed on the form material 410. As shown, the acoustic media 420 may be disposed on a plurality of sections of the form material 410. In some embodiments, as in FIG. 4B, a portion of the form material 410 may be exposed to the construction material 440. In other embodiments, the acoustic media 420 may be disposed on an entire surface of the form material 410. In some embodiments, an array of acoustic media 420 may comprise a first acoustic panel and a second acoustic panel wherein the first acoustic panel comprises at least one characteristic that varies from the second acoustic panel. The at least one characteristic that varies may comprise one or more of a density of acoustic media, a dimension, a quantity of discrete densities, and a configuration of discrete densities. FIG. 4C is a top view of a configuration of a multi-layered construction material 400 comprising a form material 410, an acoustic medium 420 (shown in phantom), and a construction material 440.

Figure 5:
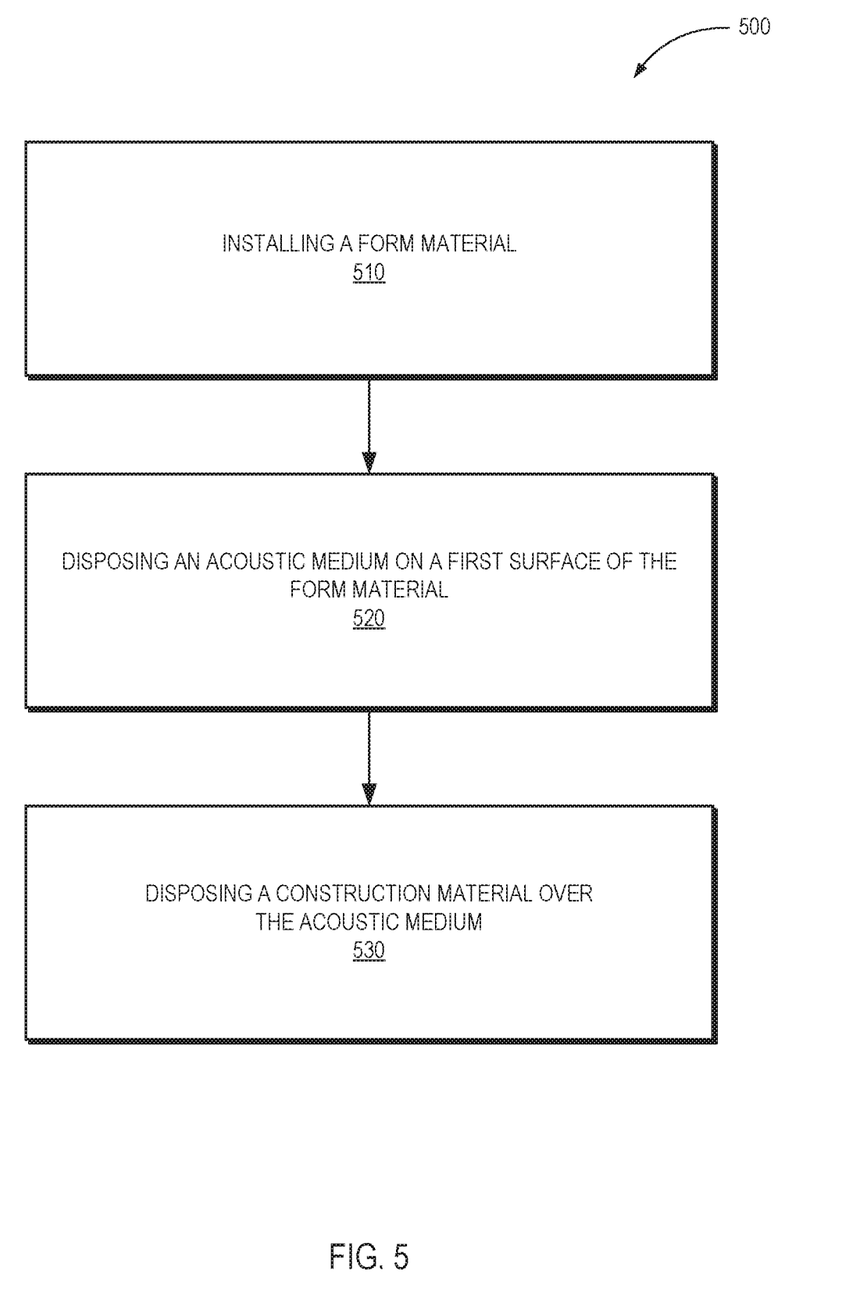
FIG. 5 is a flowchart of a method for constructing a multi-layered sound absorption structure, according to an embodiment of the disclosure.

FIG. 5 is a flowchart illustrating a method 500 for constructing a multi-layered structure comprising 510 installing a form material, 520 disposing an acoustic medium on a first surface of the form material, and 530 disposing a construction material over at least one surface of the acoustic medium. In some embodiments of method 500, 510 installing a form material comprises building a support structure to support a form elevated above a lower surface, such as a floor of a lower story of a multi-story building. In some embodiments, the acoustic medium is disposed on the first surface of the form material using one or more coupling mechanisms such as a bolt, a screw, a tack, a nail, a pin, or the like. One or more coupling mechanisms may be useful for a multi-layered structure comprising a vertical component wherein the acoustic material is disposed on a vertical surface of the form material.

Figure 6:
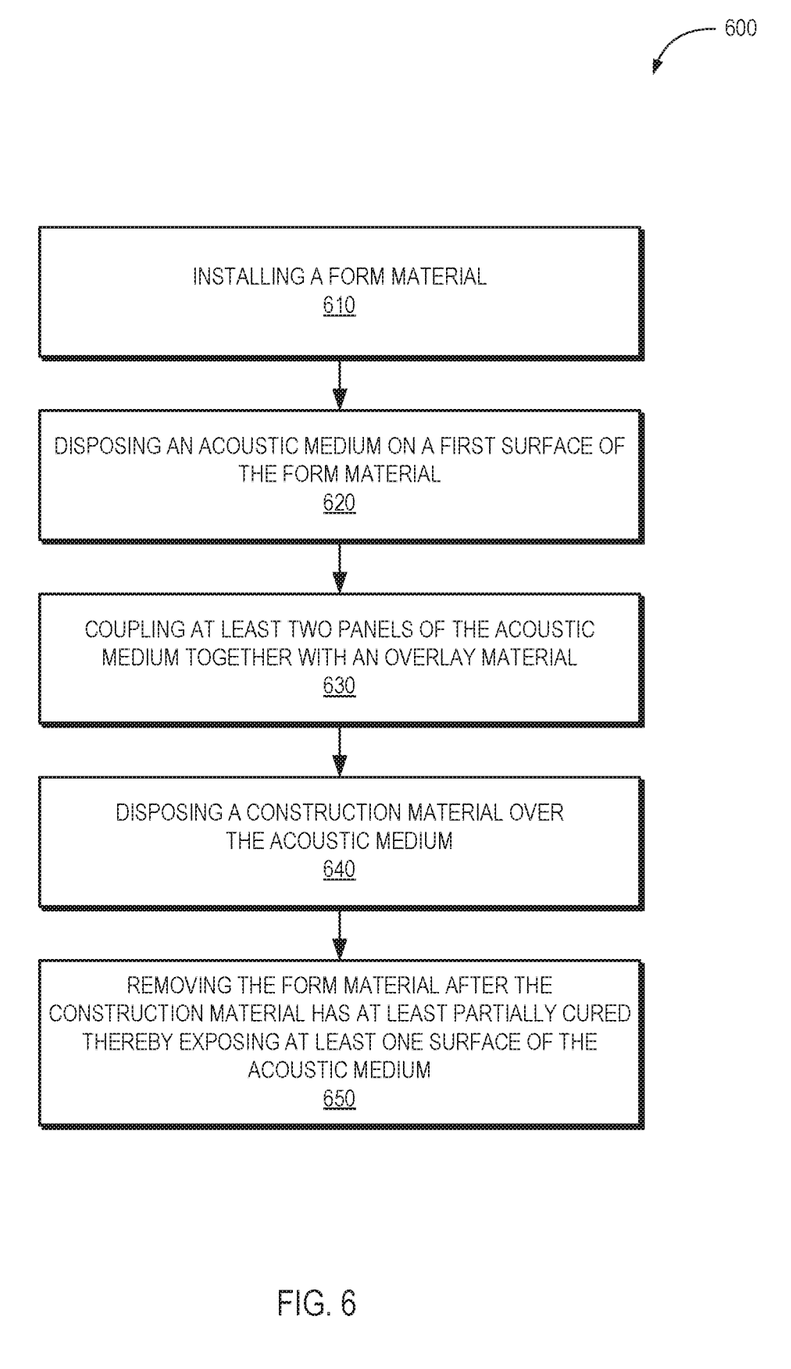
FIG. 6 is another embodiment of a method for constructing a multi-layered sound absorption structure.

FIG. 6 is a flowchart illustrating a method 600 for constructing a multi-layered structure comprising 610 installing a form material, 620 disposing an acoustic medium on a first surface of the form material, 630 coupling at least two panels of the acoustic medium together with an overlay material (e.g., such as a moisture resistant overlay material), 640 disposing a construction material over at least one surface of the acoustic medium, and 650 removing the form material after the construction material has at least partially cured thereby exposing at least one surface of the acoustic medium.

Although embodiments have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art. The scope of the present invention should, therefore, be determined only by the following claims.

The invention claimed is:

1. A method of constructing a sound absorbing building structure comprising:
    installing a form material;
    disposing an array of acoustic panels on a first surface of the form material, each of the acoustic panels within the array being pre-formed and comprising a fibrous acoustic medium having a width of between about two feet and about six feet, a length of between about two feet and about 10 feet, and a thickness of between about one half inch and about 6 inches, the fibrous acoustic medium comprising a nonwoven material comprising a high melt acoustic material and a low melt acoustic material and being porous and permeable to water vapor;
    disposing a construction material over the array of acoustic panels, wherein the construction material comprises a cementitious material, the construction material being in a fluid state when being disposed over the array of acoustic panels such that the construction material flows between adjacent acoustic panels within the array; and
    curing the construction material to form a floor or ceiling of a building structure;
    wherein one or more of the acoustic panels comprises:
        a first region, a second region, and a third region, wherein a density of the second region is lower than a density of the first region and the third region, and the second region is disposed between the first region and the third region;
        wherein a density of the first region is higher than a density of the third region;
        wherein the first region is disposed adjacent the form material or the construction material; and
        wherein the third region is disposed adjacent the other of the form material or the construction material.

2. The method of claim 1, further comprising coupling the array of acoustic panels on the first side of the form material.

3. The method of claim 1, further comprising removing the form material and exposing at least a portion of the array of acoustic panels.

4. The method of claim 1, wherein each of the acoustic panels consists of a fibrous acoustic material.

5. The method of claim 1, wherein the array of acoustic panels comprises a barrier between the array of acoustic panels and the construction material.

6. The method of claim 1, wherein the construction material extends into the array of acoustic panels by a distance of between about 1/32 and about 1/8 inches.

7. The method of claim 1, wherein the array of acoustic panels comprises fiberglass.

8. The method of claim 1, wherein the array of acoustic panels comprises polyester fiber.

9. The method of claim 1, further comprising removing the form material such that a surface of each of the acoustic panels is exposed.

10. The method of claim 1, wherein a portion of the construction material is interdigitated with a region of the array of acoustic panels.

11. The method of claim 1, wherein the high melt acoustic material comprises a melting point of above 450 degrees Fahrenheit and the low melt acoustic material comprises a melting point of above 320 degrees Fahrenheit.

12. The method of claim 1, wherein the acoustic medium comprises between 50% and 90% by weight of the high melt acoustic material and from about 10% to about 30% by weight of the low melt acoustic material.

13. A method of constructing a sound absorbing building structure comprising:
    installing a form material;
    disposing an array of acoustic panels on a first surface of the form material, each of the acoustic panels within the array being pre-formed and consisting of a fibrous acoustic medium having a width of between about two feet and about six feet, a length of between about two feet and about 10 feet, and a thickness of between about one half inch and about 6 inches, the fibrous acoustic medium comprising a nonwoven material and being porous and permeable, and a first panel of the array of acoustic panels having a first density and a second panel of the array of acoustic panels having a second density different than the first density;

disposing a construction material over the array of acoustic panels, the construction material being in a fluid state when being disposed over the array of acoustic panels such that the construction material flows between adjacent acoustic panels within the array;

curing the construction material to form a floor or ceiling structure; and removing the form material and exposing at least a portion of the array of acoustic panels;

wherein one or more of the acoustic panels comprises:
a first region, a second region, and a third region, wherein a density of the second region is lower than a density of the first region and the third region, and the second region is disposed between the first region and the third region;
wherein a density of the first region is higher than a density of the third region;
wherein the first region is disposed adjacent the form material or the construction material; and
wherein the third region is disposed adjacent the other of the form material or the construction material.

14. The method of claim 13, wherein a portion of the construction material is interdigitated with a region of the array of acoustic panels.

15. The method of claim 13, wherein the array of acoustic panels comprises a barrier between the array of acoustic panels and the construction material.

16. The method of claim 13, wherein the cured construction material is coupled to the array of acoustic panels.

17. A method of constructing a sound absorbing building structure comprising:
installing a form material;
disposing an array of acoustic panels on a first surface of the form material, each of the acoustic panels within the array being pre-formed and comprising a fibrous acoustic medium having a width of between about two feet and about six feet, a length of between about two feet and about 10 feet, and a thickness of between about one half inch and about 6 inches, the fibrous acoustic medium comprising a nonwoven material free of a first cementitious material and being porous and permeable to water vapor;

disposing a construction material over the array of acoustic panels, wherein the construction material comprises a second cementitious material, the construction material being in a fluid state when being disposed over the array of acoustic panels such that the construction material flows between adjacent acoustic panels within the array; and curing the construction material to form a floor or ceiling of a building structure;

wherein one or more of the acoustic panels comprises:
a first region, a second region, and a third region, wherein a density of the second region is lower than a density of the first region and the third region, and the second region is disposed between the first region and the third region;
wherein a density of the first region is higher than a density of the third region;
wherein the first region is disposed adjacent the form material or the construction material; and
wherein the third region is disposed adjacent the other of the form material or the construction material.

\* \* \* \* \*